United States Patent
Chugunov et al.

(10) Patent No.: US 11,598,185 B2
(45) Date of Patent: Mar. 7, 2023

(54) METHODS FOR ADAPTIVE OPTIMIZATION OF ENHANCED OIL RECOVERY PERFORMANCE UNDER UNCERTAINTY

(71) Applicant: SCHLUMBERGER TECHNOLOGY CORPORATION, Sugar Land, TX (US)

(72) Inventors: Nikita Chugunov, Arlington, MA (US); Terizhandur S. Ramakrishnan, Boxborough, MA (US); Pierre Barrat-Charlaix, Palaiseau (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 629 days.

(21) Appl. No.: 14/949,032

(22) Filed: Nov. 23, 2015

(65) Prior Publication Data
US 2016/0145977 A1  May 26, 2016

Related U.S. Application Data

(60) Provisional application No. 62/083,528, filed on Nov. 24, 2014.

(51) Int. Cl.
*E21B 43/16* (2006.01)
*G06F 17/11* (2006.01)

(52) U.S. Cl.
CPC .............. *E21B 43/16* (2013.01); *G06F 17/11* (2013.01)

(58) Field of Classification Search
CPC ........ E21B 43/16; E21B 41/0092; G06F 17/11
See application file for complete search history.

(56) References Cited

U.S. PATENT DOCUMENTS 6,775,578 B2   8/2004  Couet et al.
7,512,543 B2 *  3/2009  Raghuraman .......... G01V 11/00
                                               703/10
(Continued)

OTHER PUBLICATIONS

Carrero, Enrique, Nestor V. Queipo, Salvador Pintos, and Luis E. Zerpa. "Global sensitivity analysis of Alkali-Surfactant-Polymer enhanced oil recovery processes." Journal of Petroleum Science and Engineering 58, No. 1-2 (2007): 30-42. (Year: 2007).*

(Continued)

*Primary Examiner* — Steven W Crabb
(74) *Attorney, Agent, or Firm* — Ashley E. Brown

(57) ABSTRACT

Methods are provided for adaptive optimization of enhanced oil recovery project performance under uncertainty. Predictive physics-based reservoir simulation is used to estimate performance of the project. Input parameters of the model are divided into control variables and uncertain variables. The reservoir model is optimized to obtain values of control variables maximizing mean value of a chosen performance metric under initial uncertainty of formation and fluid properties. An efficient frontier can characterize dependence between the optimized mean value of the performance metric and its uncertainty expressed by the standard deviation. Global sensitivity analysis (GSA) is then applied to quantify and rank contributions from uncertain input parameters to the standard deviation of the optimized values of the performance metric. Additional measurements can be performed to reduce uncertainty in the high-ranking parameters. Constrained optimization of the model with reduced ranges of uncertain parameters is performed and a new efficient frontier is obtained.

21 Claims, 6 Drawing Sheets

(56) References Cited

U.S. PATENT DOCUMENTS

| | | | |
|---|---|---|---|
| 8,311,743 B2 | 11/2012 | Gurpinar | |
| 8,548,785 B2* | 10/2013 | Chugunov | G01V 11/00 |
| | | | 703/10 |
| 8,646,525 B2* | 2/2014 | Izgec | E21B 43/16 |
| | | | 166/250.02 |
| 8,793,111 B2 | 7/2014 | Tilke et al. | |
| 9,726,001 B2 | 8/2017 | Chugunov et al. | |
| 2003/0225606 A1 | 12/2003 | Raghuraman et al. | |
| 2006/0224369 A1 | 10/2006 | Yang et al. | |
| 2009/0020284 A1 | 1/2009 | Graf et al. | |
| 2009/0043555 A1* | 2/2009 | Busby | E21B 43/00 |
| | | | 703/10 |
| 2010/0300682 A1* | 12/2010 | Thakur | E21B 43/00 |
| | | | 166/250.01 |
| 2011/0290479 A1 | 12/2011 | Izgec et al. | |
| 2013/0110483 A1 | 5/2013 | Chugunov et al. | |
| 2014/0278110 A1 | 9/2014 | Chugunov et al. | |
| 2014/0303951 A1 | 10/2014 | Houeto et al. | |
| 2015/0355374 A1* | 12/2015 | Morton | G01V 1/50 |
| | | | 703/10 |
| 2016/0216404 A1 | 7/2016 | Kristensen et al. | |

OTHER PUBLICATIONS

Mollaei, Alireza, Larry Wayne Lake, and Mojdeh Delshad. "Application and variance based sensitivity analysis of surfactant-polymer flood." In SPE Reservoir Simulation Symposium. Society of Petroleum Engineers, (Year: 2011).*

Matieyendou Lamboni, et al., "Multivariate sensitivity analysis to measure global contribution of input factors in dynamic models," Reliability Engineering and System Safety 96 pp. 450-459 (Year: 2011).*

William J. Bailey, et al., "Reservoir Optimization Tool for Risk and Decision Analysis," 9th European Conference on the Mathematics of Oil Recovery, pp. 1-11 (Year: 2004).*

Salvador Pintos, et al., "Asymptotic Dykstra-Parson Distribution, Estimates and Confidence Intervals," International Association for Mathematical Geosciences, pp. 329-343 (Year: 2011).*

Al-Mjeni, R. et al., "Has the Time Come for EOR?", Oilfield Review, 2011, 22(4), pp. 16-35.

Archer, G.E.B. et al., "Sensitivity Measures, ANOVA-Like Techniques and the Use of Bootstrap", Journal of Statistical Computation and Simulation, 1997, 58, pp. 99-120.

Berveiller, M. et al., "Stochastic finite element: a non intrusive approach by regression", Revue Europeenne de Mecanique Numerique, 2006, 15 (1-2-3), pp. 81-92.

Chastaing, G. et al., "Generalized Hoeffding-Sobol decomposition for dependent variables—application to sensitivity analysis", Electronic Journal of Statistics, 2012, 6, pp. 2420-2448.

Christie, M. A. et al., "Tenth SPE Comparative Solution Project: A Comparison of Upscaling Techniques", SPE66599, 2001, presented at the SPE Reservoir Simulation Symposium, Houston, Texas, U.S.A., pp. 308-317.

Gautschi, W., "Construction of Gauss-Christoffel Quadrature Formulas", Mathematics of Computation, 1968, 22(10), pp. 251-270.

Homma, T. et al., "Importance measures in global sensitivity analysis of nonlinear models", Reliability Engineering and System Safety, 1996, 52(1), pp. 1-17.

Isukapalli, S., "Uncertainty Analysis of Transport-Transformation Models", thesis, Rutgers, The State University of New Jersey, 1999, 218 pages.

Kucherenko, S. et al., "Metamodelling and Global Sensitivity Analysis of Models with Dependent Variables", AIP Conference Proceedings, 2011, 1389, pp. 1913-1916.

Morokoff, W. J. et al., "Quasi-Random Sequences and Their Discrepancies", SIAM Journal on Scientific Computing, 1994, 15(6), pp. 1251-1279.

Novak, E. et al., "Simple Cubature Formulas with High Polynomial Exactness", Constructive Approximation, 1999, 15(4), pp. 499-522.

Oladyshkin, S. et al., "Data-driven uncertainty quantification using the arbitrary polynomial chaos expansion", Reliability Engineering & System Safety, 2012, 106, pp. 179-190.

Oladyshkin, S. et al., "Polynomial Response Surfaces for Probabilistic Risk Assessment and Risk Control via Robust Design", in Novel Approaches and Their Applications in Risk Assessment, Dr. Yuzhou Luo (Ed.), 2012, pp. 1-38.

Rabitz, H., et al., "Global Sensitivity Analysis for Systems with Independent and/or Correlated Inputs", Journal of Physical Chemistry A, 2010, 114, pp. 6022-6032.

Raghuraman, B. et al., "Valuation of Technology and Information for Reservoir Risk Management", SPE 86568, SPE Reservoir Evaluation & Engineering, 2003, 6(5), pp. 307-316.

Ramakrishnan T. S. et al., "Effect of Adsorption on the Optimal Displacement of Acidic Crude Oil by Alkali", AIChE Journal, 1990, 36(5), pp. 725-737.

Saltelli, A. et al., "Variance-Based Methods", in Global Sensitivity Analysis: The Primer, Wiley-Interscience, 2008, pp. 164-169.

Saltelli, A., et al., "Global Sensitivity Analysis for Importance Assessment", in Sensitivity Analysis in Practice: A Guide to Assessing Scientific Models, John Wiley & Sons, First Edition, 2004, pp. 42-61.

Saltelli, A., et al., "Methods Based on Decomposing the Variance of the Output" in Sensitivity Analysis in Practice: A Guide to Assessing Scientific Models, John Wiley & Sons, First Edition, 2004, pp. 109-135.

Saltelli, A., "Making the best use of model valuations to compute sensitivity indices", Computer Physics Communications, 2002, 145(2), pp. 280-297.

Sobol, I. M., "Sensitivity Estimates for Nonlinear Mathematical Models", Mathematical Modeling and Computational Experiment, 1993, 1(4), pp. 407-414.

Sobol, I. M., "Global sensitivity indices for nonlinear mathematical models and their Monte Carlo estimates". Mathematics and Computers in Simulation, 2001, 55, pp. 271-280.

Sudret, B., "Global sensitivity analysis using polynomial chaos expansions", Reliability Engineering and System Safety, 2008, 93(7), pp. 964-979.

Trefethen, L. N., "Is Gauss Quadrature Better than Clenshaw Curtis?", SIAM Review, 2008, 50(1), pp. 67-87.

Wiener, N., "The Homogeneous Chaos", American Journal of Mathematics, 1938, 60(4), pp. 897-936.

Xie, D., "Efficient Collocational Approach for Parametric Uncertainty Analysis", Communications in Computational Physics, 2007, 2(2), pp. 293-309.

Search Report and Written Opinion of related International Patent Application No. PCT/US2014/052837 dated Dec. 2, 2014, 10 pages.

Sobol, I. M., "Quasi Monte-Carlo methods", Progress in Nuclear Energy, 1990, 24(1-3), pp. 55-61.

* cited by examiner

METHODS FOR ADAPTIVE OPTIMIZATION OF ENHANCED OIL RECOVERY PERFORMANCE UNDER UNCERTAINTY

PRIORITY

The present application claims the benefit of U.S. Application Ser. No. 62/083,528 filed Nov. 24, 2014, which application is incorporated herein, in its entirety, by reference.

TECHNICAL FIELD

The subject disclosure relates to the hydrocarbon industry. More particularly, the subject disclosure relates to enhanced oil recovery (EOR) methods.

BACKGROUND

Enhanced oil recovery allows for higher recovery efficiency which could not be achieved by traditional recovery mechanisms. An oilfield installation for EOR is seen in prior art FIG. 1 which shows an EOR installation 13 including an injection well 30 and a production well 38. During an EOR process, injection fluid 43 is injected through the injection well 30 into a reservoir formation 46 and establishes a fluid front 47 that moves through a rock matrix within the reservoir formation 46. The injection fluid 43 increases pressure within the reservoir formation, mobilizes bypassed oil and forces hydrocarbons toward the production well 38. The location of the fluid front 47 may be monitored by various means such as a monitoring well (not shown).

EOR performance is evaluated using prescribed performance metrics (e.g., incremental oil production, recovery factor, displacement efficiency, financial indicators of project profitability, etc.) computed by running a reservoir simulation. For example, EOR performance may be predicted using numerical simulations such as ECLIPSE (a trademark of Schlumberger), or a more specialized tool such as the one disclosed by U.S. Pat. No. 8,311,743 to Gurpinar entitled "Method for Generating an Estimation of Incremental Recovery From a Selected Enhanced Oil Recovery (EOR) Process" which is hereby incorporated by reference herein in its entirety. The tool receives inputs relating to the well locations, production/injection schedule, formation and fluid properties, selected EOR process etc., and provides a prediction of the EOR performance including total and incremental oil produced, recovery factor, displacement efficiency, etc.

In the presence of uncertainty in formation and fluid properties, optimal EOR strategies will result in inherently uncertain predictions of a prescribed performance metric. A standard approach to optimization under uncertainty is based on original Markovitz portfolio theory and more recently was tailored to oilfield applications with a modified definition of efficient frontier. See, U.S. Pat. No. 6,775,578 to B. Couet, et al. entitled "Optimization of Oil Well Production with Deference to Reservoir and Financial Uncertainty" which is hereby incorporated by reference herein in its entirety, and Raghuraman, B., et al., "Valuation of Technology and Information for Reservoir Risk Management," SPE 86568, SPE Reservoir Engineering, 6, No. 5, pp. 307-316, October 2003. These methods employ a mean-variance approach. Including sensitivity analysis in an optimization under uncertainty workflow is shown U.S. Patent Application Publication No. 2010/0185427 by P. Tilke et al. The sensitivity is defined for a figure of merit with respect to uncertain formation properties and computed using an experimental design approach. Value of information is then computed based on a mean-variance objective function related to a figure of merit.

SUMMARY

In one embodiment, a method for adaptive optimization of an EOR project under uncertainty involves using a predictive physics-based reservoir simulation (model) to estimate performance of an EOR project. Performance may be measured with respect to one or more quantities such as total or incremental oil production, recovery factor, displacement efficiency, net present value (NPV), etc. The input parameters of the model are divided into control variables such as target well production, injection rates, injector/production well spacing, chemical composition of an EOR agent, etc., and uncertain variables related to uncertain formation and fluid properties such as porosity, permeability, parametric dependence of relative permeability curves, viscosity as a function of an EOR agent, EOR agent adsorption by the formation rock, etc. The reservoir model is first optimized to obtain values of control variables maximizing mean value of the chosen performance metric under initial uncertainty of formation and fluid properties. An efficient frontier may be obtained at this step to characterize dependence between the optimized mean value of the performance metric and its uncertainty expressed by the standard deviation. Global sensitivity analysis (GSA) is then applied to quantify and/or rank contributions from uncertain input parameters to the standard deviation of the optimized values of the performance metric. Uncertain parameters are ranked according to their calculated sensitivity indices and additional measurements can be performed to reduce uncertainty in the high-ranking parameters. The additional measurements can include downhole and laboratory measurements and an EOR pilot designed to reduce uncertainty in the identified high-ranking parameters. Constrained optimization of the model with reduced ranges of uncertain parameters is performed and a new efficient frontier is obtained. In most cases, the results will show a reduction in the risk associated with achieving the desired performance of an EOR project.

In one embodiment, after uncertain parameters are quantified and/or ranked for their contributions to the standard deviation of optimized values of the performance metric, one or more uncertain parameters that are identified as contributing little to the standard deviation may be assigned fixed values, thereby reducing the computational resources necessary for practicing the disclosed methods.

In one aspect, disclosed methods provide an adaptive GSA-optimization approach that results in uncertainty reduction for optimized EOR performance.

In one aspect, disclosed methods allow the progressive reduction of uncertainty in the predicted performance of an iteratively optimized EOR operational strategy by guided reduction of uncertainty in identified properties of the reservoir.

In further embodiments, any of the methods described above can be implemented by a system that includes a measurement tool and a processing system.

Additional aspects, embodiments, objects and advantages of the disclosed methods may be understood with reference to the following detailed description taken in conjunction with the provided drawings.

DETAILED DESCRIPTION

Figure 1:
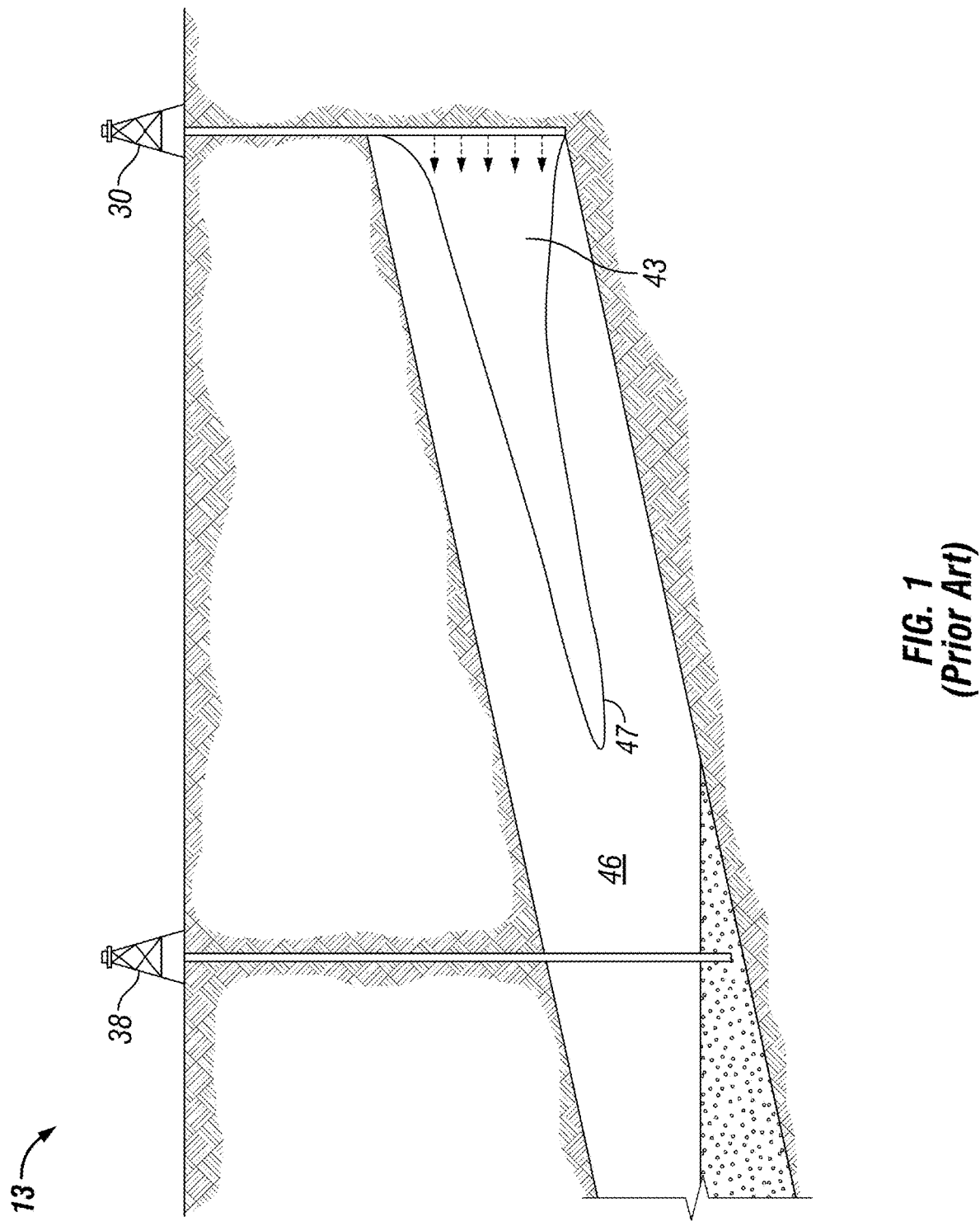
FIG. 1 is a schematic of a prior art EOR installation.

Before turning to the Figures, it is useful to understand the scientific basis of the disclosed methods. Consider a general case when an underlying physical process is modeled by a function $y=f(\alpha, \beta)$, where $\alpha=\{\alpha_1 \ldots \alpha_N\}$ and $\beta=\{\beta_1 \ldots \beta_M\}$ are two sets of parameters. Here, $\alpha$ represents a set of control parameters (to be used in optimization), and $\beta$ denotes a set of uncertain parameters. Mathematically, $\beta$ are considered to be random variables represented by a joint probability density function (pdf). Therefore, for each vector of control variables $\alpha$, the output of the model is itself a random variable with its own pdf due to uncertainty in $\beta$.

A mean-variance approach is commonly used for optimization, i.e. a function of the form $$F(\alpha,\beta)=\mu(\alpha,\beta)-\gamma\sigma(\alpha,\beta) \quad (1)$$

where $\mu$ and $\sigma$ are the mean and standard deviation of the output y of the numerical simulation, and $\lambda$ is a non-negative parameter defining a tolerance to risk (uncertainty), is maximized (or minimized). Note that $\mu$ and $\sigma$ vary with $\alpha$ for a given sampling over $\beta$. The optimization problem may then be formulated as $$\max_\alpha F(\alpha,\beta) \quad (2)$$

For each optimization iteration, a number of samples of the random vector $\beta$ are chosen, and the values of $y(\alpha, \beta)$ are first computed using this sample for a given $\alpha$ and then averaged over $\beta$. Various optimization algorithms can then be used to find the optimal value of $\alpha$. The process of optimizing under uncertainty will lead to a set of parameters $\alpha_{opt}$ that provide the optimum of the objective function F. Therefore, an optimized model is now available:

$$y=f(\alpha_{opt},\beta) \quad (3)$$

Note that the optimized model still has inherent uncertainty due to the uncertainty in parameters $\beta$.

A set of solutions to the optimization problem can be plotted in $(\mu, \sigma)$ coordinates, where optimal points corresponding to pre-defined values of $\lambda$ will form an efficient frontier as described in more detail hereinafter with respect to FIG. 5. The slope of the objective function values on the frontier illustrates the penalty for additional uncertainty (risk).

From the operational perspective, the goal is to reduce this risk while maintaining the same level of expected performance (represented by $\mu$). In order to reduce the uncertainty, it is useful to understand where it is coming from. Therefore, a quantitative link between uncertainties in input parameters ($\beta$) and uncertainty in the output can be desirable. According to one aspect, this link can be quantified using Global Sensitivity Analysis (GSA) based on variance decomposition.

Global sensitivity analysis based on variance decomposition may be used to calculate and apportion the contributions to the variance of the model prediction Var(Y) from the uncertain input parameters $\{\beta_i\}$ of the subsurface model. See, Saltelli, A., et al., Sensitivity Analysis in Practice. A Guide to Assessing Scientific Models: John Wiley & Sons (2004).

For independent $\{\beta_i\}$, the Sobol' variance decomposition (See, Sobol, I. M., "Sensitivity estimates for nonlinear mathematical models", Mathematical Modeling and Computational Experiment, 1, pp. 407-414 (1993)) can be used to represent Var(Y) as $$\text{Var}(Y)=\Sigma_{i=1}^{N}V_i+\Sigma_{1\leq i<j\leq N}V_{ij}+\ldots+V_{12\ldots N}, \quad (4)$$

where $V_i=\text{Var}[E(Y|\beta_i)]$ are the variance in conditional expectations (E) representing first-order contributions to the total variance Var(Y) when $\beta_i$ is fixed i.e., Var($\beta_i$)=0. Since the true value of $\beta_i$ is not known a priori, the expected value of Y should be estimated when $\beta_i$ is fixed anywhere within its possible range, while the rest of the input parameters $\{\beta_{-i}\}$ are varied according to their original probability distributions. Thus, the first-order effect $$S1_i=V_i/\text{Var}(Y) \quad (5)$$

is an estimate of relative reduction in total variance of Y if the variance in $\beta_i$ is reduced to zero.

Similarly, $V_{ij}=\text{Var}[E(Y|\beta_i, \beta_j)]-V_i-V_j$ is the second-order contribution to the total variance Var(Y) due to interaction between $\beta_i$ and $\beta_j$. It should be noted that the estimate of variance Var[E(Y|$\beta_i$, $\beta_j$)] when both $\beta_i$ and $\beta_j$ are fixed simultaneously should be corrected for individual contributions $V_i$ and $V_j$.

For additive models Y($\beta$), the sum of all first-order effects $S1_i$ is equal to 1. This is not applicable for the general case of non-additive models, where second, third and higher-order effects (i.e., interactions between two, three or more input parameters) play an important role. The contribution due to higher-order effects can be estimated via a total sensitivity index ST:

$$ST_i=\{\text{Var}(Y)-\text{Var}[E(Y|\beta_{-i})]\}/\text{Var}(Y), \quad (6)$$

where $\text{Var}(Y)-\text{Var}[E(Y|\beta_{-i})]$ is the total variance contribution from all terms in equation (4) that include $\beta_i$. It is noted that $ST_i \geq S1_i$, and the difference between the two represents the contribution from the higher-order interaction effects that include $\beta_i$.

There are several methods available to estimate $S1_i$ and $ST_i$ and a comprehensive review of those methods can be seen in Saltelli, A., et al., Global Sensitivity Analysis: The Primer, Wiley-Interscience (2008).

In one embodiment, Polynomial Chaos Expansion (PCE) (See, Wiener, N., "The homogeneous chaos", Am. J. Math 60, pp. 897-936 (1938)) is applied to approximate the underlying optimized function $y=f(\alpha_{opt},\beta)$. An advantage of applying PCE may be that all GSA sensitivity indices can be calculated explicitly once the projection on the orthogonal polynomial basis is computed (See, Sudret, B., "Global sensitivity analysis using polynomial chaos expansions", Reliability Engineering and System Safety, 93(7) pp. 964-979 (2008)).

In another embodiment, GSA sensitivity indices can be calculated using an algorithm developed by Saltelli, A., "Making the best use of model valuations to compute sensitivity indices", Computer Physics Communications 145, pp. 280-297 (2002) that further extends a computational approach proposed by Sobol, I. M., 1990, "Quasi Monte-Carlo methods", Progress in Nuclear Energy, 24, pp. 55-61 (1990), and Homma, T. and Saltelli, A., "Importance measures in global sensitivity analysis of model output", Reliability Engineering and System Safety, 52(1), pp. 1-17, (1996). The computational cost of calculating both $S1_i$ and $ST_i$ is N(k+2), where k is a number of input parameters $\{\beta_i\}$ and N is a large enough number of model calls (typically between 1000 and 10000) to obtain an accurate estimate of conditional means and variances. However, with underlying physical model taking up to several hours to run even on the most sophisticated computer systems, this computational cost can be prohibitively high. Therefore, proxy-models that approximate computationally expensive original simulators can be used. Quasi-random sampling strategies such as LPτ sequences (Sobol, I. M., "Quasi Monte-Carlo methods", Progress in Nuclear Energy, 24, pp. 55-61 (1990)) can be employed to improve the statistical estimates of the computed GSA indices.

Once sensitivity indices are computed, uncertain β-parameters can be ranked according to values of S1. Parameters with the highest values of S1 can be selected for a targeted measurement program. Reduction in uncertainty of these parameters will result in largest reduction in uncertainty of predicted model outcome. In one embodiment, parameters with lowest values of ST (typically, below 0.05) can be fixed at their base case value, thus reducing dimensionality of the underlying problem and improving the computational cost of the analysis.

Figure 2:
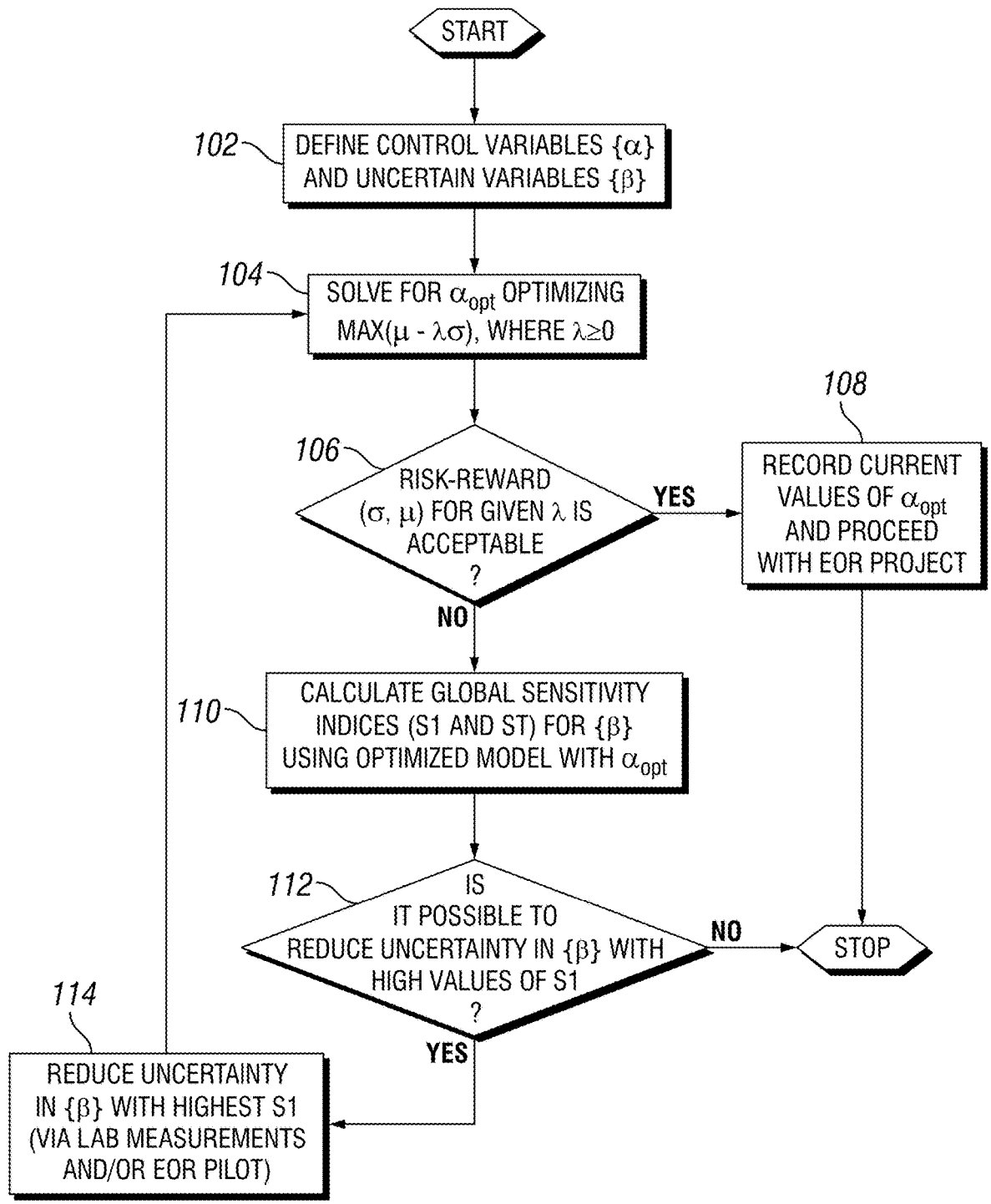
FIG. 2 is a flow chart of a method for adaptively optimizing EOR performance in the presence of uncertainty.

Turning now to FIG. 2, one method for adaptive optimization under uncertainty is shown. At 102, control variables (α) and uncertain parameters (β) are defined. By way of example only and not by way of limitation, and as described hereinafter, the control variables may include variables such as a target rate of a production well, a target rate of an injection well, an EOR agent concentration in the injected fluid at various stages of the project, etc., while the uncertain parameters may include parameters such as porosity, permeability, multipliers for functions such as the viscosity of water as a function of an EOR agent concentration, surface tension of water-oil interface as a function of an EOR agent concentration, saturated concentration of an EOR agent adsorbed by the rock formation, miscibility of oil and water with an EOR agent as a function of the logarithm of the capillary number, two-phase relative permeability to water and oil as a function of water saturation, two-phase relative permeability to gas and oil as a function of gas saturation, etc. In one embodiment, if applicable, ranges for control variables may be defined. Probability distribution functions (pdfs) for uncertain parameters are also defined. At 104, optimization under uncertainty is performed; e.g., (max F(α, β), where F=μ(α, β)−λσ(α, β)), and relevant points on the efficient frontier for one or more values of λ are constructed. At 106, in one embodiment, in a first pass through, a determination is made as to whether the risk-reward (σ, μ) for a given λ is acceptable. If it is, at 108, the current values of the optimized a parameters ($\alpha_{opt}$) are recorded and no further processing is required, although, if desired, additional processing may be conducted. At this point, the EOR operation can be performed on the formation using the optimized control variables. If the risk-reward is not acceptable, or if further processing is desired, at 110, for a given point on the efficient frontier (defined by prescribed value of λ and corresponding values of control parameters $\alpha_\lambda$), one or more GSA sensitivity indices are calculated (e.g., S1 and/or ST) for the uncertain parameters using the optimized parameters $\alpha_{opt}$, and the uncertain parameters β are ranked according to values of S1 and/or ST. At 112, in one embodiment, a determination is optionally made as to whether it is possible to reduce uncertainty in one or more of the uncertain parameters β having a high value of S1. If reduction of uncertainty is not possible, the process is completed. However, if reduction of uncertainty is possible, at 114 measurements are made to reduce uncertainty in one or more uncertain parameters. The measurements may include measurements of the formation and/or the fluids properties within the formation. For example, a core sample may be obtained from the formation and the core sample can be analyzed to obtain a measure of permeability and/or porosity of the formation. Core flooding experiments can be performed to determine relative permeability curves and/or EOR agent adsorption by the rock. Laboratory experiments can be performed to characterize rheology of an EOR agent. In another example, a wireline tool is used to sample fluid from the formation and draw the fluid into the tool. The fluid can then be analyzed within the tool and/or brought to the surface in a sample bottle to be analyzed in a laboratory environment. The fluid can be analyzed to determine its chemical composition (e.g., gas content, asphaltene content, light hydrocarbon, heavy hydrocarbon, hydrogen sulfide content, and/or mercury content) and/or its physical characteristics (e.g., viscosity, density, bubble point, asphaltene onset pressure, and/or dew point). These measurements are then used to reduce the uncertainty of one or more of the parameters. Having made measurements to reduce uncertainty, the method continues at 104, 106, etc., until the risk-reward for a given tolerance to risk λ is acceptable at 106 (and the EOR project is performed using optimized control variables) or until it is the risk-reward for a given tolerance to risk is not acceptable and it is no longer possible at 112 to reduce uncertainty in an uncertain parameter.

In one embodiment, after calculating global sensitivity indices at 110, and prior to repeating steps 104, 106, etc., the values of parameters β with ST values below a threshold value (e.g., values of ST less than 0.05) are fixed in order to reduce the dimensionality of the optimization problem.

Figure 3:
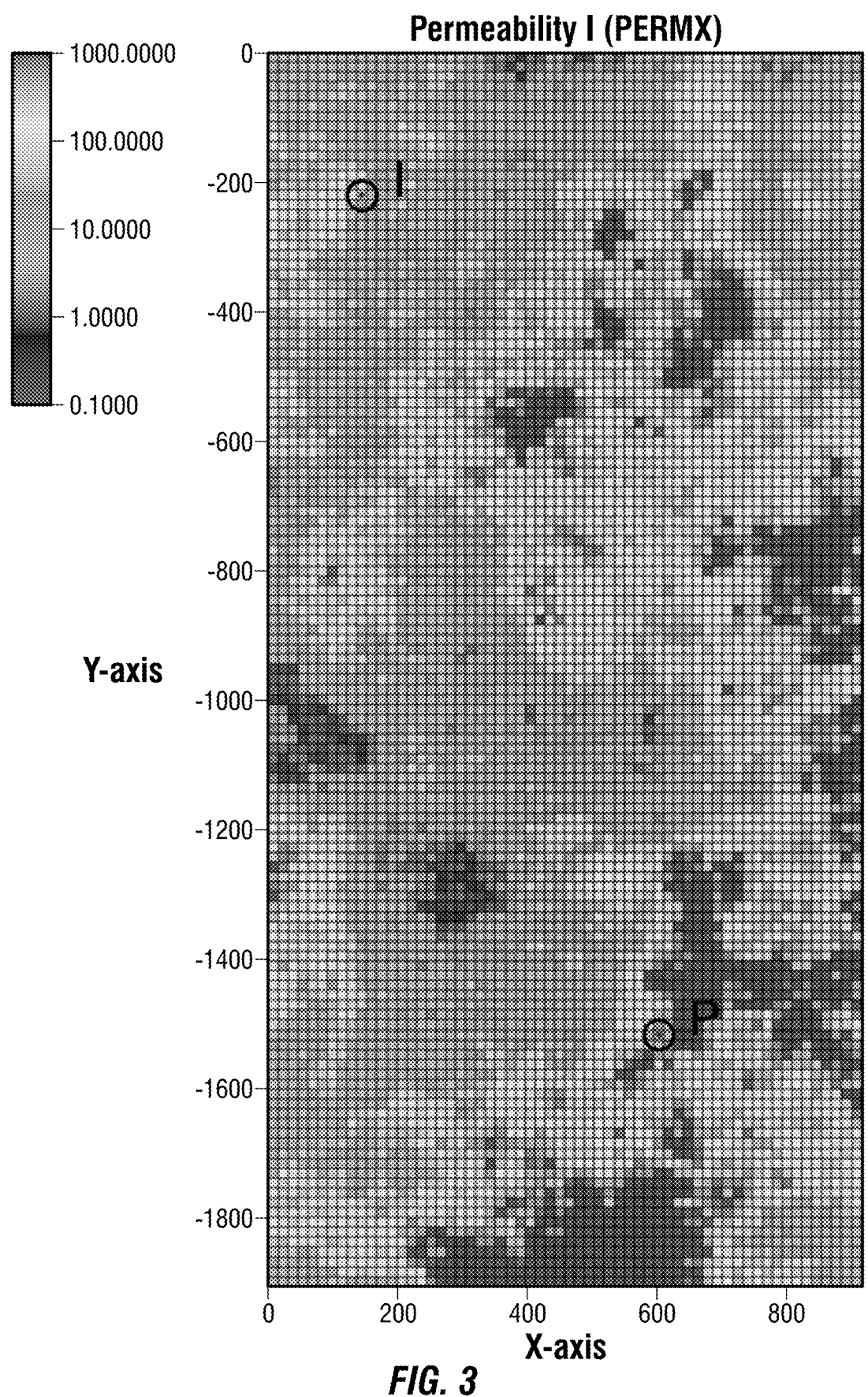
FIG. 3 is a two dimensional map of a permeability profile in a reservoir.

In one embodiment, the method of FIG. 2 is applied to a problem of EOR performance optimization. In particular, a simplified yet realistic model of a reservoir under polymer flooding may be considered. The permeability map of the reservoir model is shown in FIG. 3 and is based on layer 3 of the SPE-10 benchmark (Christie, M. A. and Blunt, M. J. 2001. Tenth SPE Comparative Solution Project: A Comparison of Upscaling Techniques. Presented at SPE Reservoir Simulation Symposium, Houston, Tex., 11-14 February. SPE-66599-MS). Porosity is assumed constant at 0.2. The objective in this study is to design a polymer flood over 20 years (1983-2002) followed by a water chase for another 4 years (2003-2006). The scenarios are simulated using the INTERSECT™ (a trademark of Schlumberger) reservoir simulator.

Cumulative oil production can be used as an EOR performance metric subjected to analysis using the method of FIG. 2. However, other examples of performance metrics that can be used include incremental oil production, recovery factor, displacement efficiency, financial indicators of project profitability, etc. Thus, control variables ($\alpha$) and uncertain parameters ($\beta$) are defined. Control variables ($\alpha$) include polymer concentrations in the injected agent that can be adjusted every year during the polymer flood phase of the project. There are a total of 18 control variables in the considered problem (the last adjustment to polymer concentration is made in 2000 and is applied until 2002). The total amount of injected polymer cannot exceed 110% of the amount of polymer injected in the base case: the scenario with a constant polymer concentration profile of 0.01 mole fraction (equivalent to 1.25 kg/sm3 or 60 kg/day injection for 14 years). Each year, the value of polymer concentration is allowed to vary between 0.0 and 0.05 mole fraction (equivalent to up to 200 kg/day injection).

Given that the considered reservoir model is based on a well-defined benchmark model, uncertain variables ($\beta$) are considered that correspond to parameters associated with the physical processes involving the presence of polymer (see INTERSECT Technical and Reference Manual v. 2013.1 for technical description of the models and Table 1 for parameter base values). The values for these parameters are typically obtained from fitting the corresponding models to laboratory data. However, given the associated cost and time required to perform detailed experimental studies, the underlying data might be incomplete or even non-existent (particularly in the early stages of the project). The uncertainty is modeled by varying the underlying physical quantity by a factor of $(1 \pm \beta_i)$.

TABLE 1

Uncertain parameters for polymer models.

| Parameter | Base value | Polymer model |
|---|---|---|
| $A_{p1}$ | 41 | Polynomial viscosity model (zero shear-rate) |
| $A_{p2}$ | 1600 | Polynomial viscosity model (zero shear-rate) |
| $\dot{\gamma}_{1/2}^0$ | 6 | Aqueous phase viscosity at non-zero shear rate |
| $\kappa$ | 2 | Aqueous phase viscosity at non-zero shear rate |
| C | 3.97 | Aqueous phase viscosity at non-zero shear rate |
| $b_{rk}$ | 41 | Permeability reduction |
| $c_{rk}$ | 0.001 | Permeability reduction |
| $A_1$ | 0.0165 | Polymer adsorption model |
| $B_1$ | 100 | Polymer adsorption model |

While underlying physical processes described by the variables above are interrelated, for simplicity, in one embodiment, it is assumed that the multipliers $\beta$ are independent. Otherwise, possible dependency among $\beta$ can be taken into account both during optimization (by ensuring proper sampling of $\beta$) and during global sensitivity analysis (GSA).

Corresponding ranges for other uncertain properties may be obtained based on underlying knowledge, previously published information, or both. Initial ranges for multipliers corresponding to uncertain variables were set at [−0.2; 0.2]. Variables were assumed to be uniformly distributed.

Figure 4:
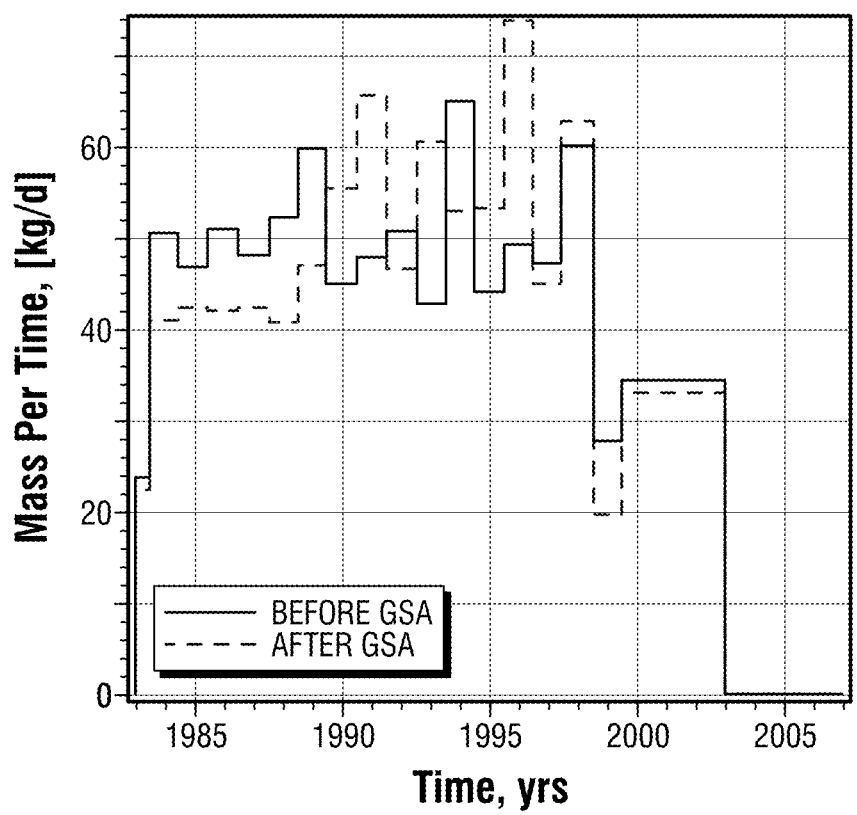
FIG. 4 is a plot of optimal polymer concentration profiles before utilizing the method of FIG. 2, and after utilizing the method of FIG. 2

With the control variables and uncertain variables defined, an optimization under uncertainty (max $F(\alpha, \beta)$, where $F = \mu(\alpha, \beta) - \lambda \sigma(\alpha, \beta)$) is performed and relevant points on the efficient frontier for various values of $\lambda$ are constructed. The underlying quantity being optimized is the gain in cumulative oil production compared to the base case scenario. Results of the optimization under uncertainty (max $F(\alpha)$, where $F = \mu(\alpha) - \lambda \sigma(\alpha)$) for three values of $\lambda = \{0, 1, 2\}$ are provided in Table 2. The values are given in terms of incremental oil production with respect to the base case (constant concentration of polymer). Recasted solution points were obtained by recalculating values of the objective function for runs performed for all values of $\lambda$ and updating the optimum for each individual $\lambda$ if a better solution is found. In this case, optimal solutions for all three considered values of $\lambda$ are given by the same vector of control parameters. The optimal profile of polymer concentration providing solution for $\lambda = \{0, 1, 2\}$ is shown in FIG. 4 ("before GSA"). Corresponding efficient frontier is shown in FIG. 5 ("before GSA"). It will be appreciated that lower values of the objective function ($\mu - \lambda \sigma$) for increasing values of $\lambda$ illustrate the inherent penalty for risk. This is evident from FIG. 6, showing values of the objective function for points in Table 2 ($\lambda = \{0, 1, 2\}$).

TABLE 2

Results of optimization with initial uncertainty (incremental oil production with respect to the base case).

| | $\lambda = 0$ | $\lambda = 1$ | $\lambda = 2$ |
|---|---|---|---|
| Mean gain, STB | 43950 | 43950 | 43950 |
| Standard deviation, STB | 4977 | 4977 | 4977 |
| Objective function, STB | 43950 | 38973 | 33996 |

For a given point on the efficient frontier (defined by prescribed value of $\lambda$ and corresponding values of control parameters $\alpha_\lambda$), GSA sensitivity indices are calculated and the uncertain parameters $\beta$ are ranked according to values of a first-order sensitivity index S1 and/or a total sensitivity index ST.

According to one aspect, GSA sensitivity indices may be calculated in various manners. In one embodiment, the previously referenced Polynomial Chaos Expansion approach is applied to calculate GSA sensitivity indices for optimized models corresponding to value $\lambda = 1$.

The values for first-order sensitivity index (S1) and total effects (ST) for each uncertain parameter $\beta$ are given in Table 3. Values of GSA indices are computed at the end of polymer injection (2003) and at the end of the project (2007). The largest contribution to uncertainty in cumulative oil recovery comes from uncertainty in parameters of shear thinning model (aqueous phase viscosity at non-zero shear rate), specifically from shear rate exponent coefficient $\tau$ (86% in 2003 and 67% in 2007). Contribution from adsorption increases at the later phase of the project.

TABLE 3

GSA first-order and total effects for $\lambda = \{0, 1, 2\}$ (uncertain parameters are ranked from highest to lowest S1 at the end of the project).

| Parameter | Polymer model | S1 in 2003 | ST in 2003 | S1 in 2007 | ST in 2007 |
|---|---|---|---|---|---|
| $\kappa$ | Aqueous phase viscosity at non-zero shear rate | 0.863 | 0.914 | 0.667 | 0.809 |
| $B_1$ | Polymer adsorption model | 1.24E−04 | 1.40E−04 | 0.102 | 0.122 |
| $c_{rk}$ | Permeability reduction | 6.98E−05 | 8.73E−05 | 0.053 | 0.056 |
| $A_1$ | Polymer adsorption model | 9.27E−05 | 9.35E−05 | 0.039 | 0.044 |
| $\dot{\gamma}_{1/2}^0$ | Aqueous phase viscosity at non-zero shear rate | 0.04 | 0.046 | 0.023 | 0.025 |
| $A_{p2}$ | Polynomial viscosity model (zero shear-rate) | 0.035 | 0.045 | 0.022 | 0.025 |
| $b_{rk}$ | Permeability reduction | 2.93E−05 | 3.32E−05 | 0.009 | 0.011 |
| C | Aqueous phase viscosity at non-zero shear rate | 0.039 | 0.040 | 0.005 | 0.006 |

TABLE 3-continued

GSA first-order and total effects for λ = {0, 1, 2} (uncertain parameters are ranked from highest to lowest S1 at the end of the project).

| Parameter | Polymer model | S1 in 2003 | ST in 2003 | S1 in 2007 | ST in 2007 |
|---|---|---|---|---|---|
| $A_{p1}$ | Polynomial viscosity model (zero shear-rate) | 0.003 | 0.003 | 0.004 | 0.004 |

Results of the analysis that identify the largest contributors to the total uncertainty allow an identification of gaps in available data about the uncertain properties β and therefore permit development of a targeted measurement program to reduce uncertainty in those parameters. A targeted measurement program may include additional downhole measurements, lab measurements, and pilot projects that include injection of a limited amount of EOR agent at preselected locations of a reservoir utilizing a log-inject-log sequence.

As previously mentioned, parameters of the model for aqueous phase viscosity at non-zero shear rate were identified as the largest contributors to variance of cumulative oil production. For illustration, additional measurements (e.g. a set of rheology experiments in the lab) were performed to reduce the uncertainty range of these parameters from initial ±20% range to ±5% range. With the additional information, optimization and GSA are repeated.

Results of the optimization step for λ={0, 1, 2} with recast points are given in Table 4. Relative reduction in standard deviation is compared to results of optimization with initial uncertainty ranges ("before GSA"). It should be noted that now, optimal solutions for λ=0 and λ={1, 2} are given by two different vectors of control parameters (polymer concentration profiles). The optimal concentration profile for polymer injection corresponding to the recast points for values λ={1, 2}) is shown in FIG. 4 ("After GSA").

TABLE 4

Results of optimization after GSA (incremental oil production with respect to the base case).

| | λ = 0 | λ = 1 | λ = 2 |
|---|---|---|---|
| Mean gain, STB | 44690 | 44460 | 44460 |
| Standard deviation, STB | 3930 | 3656 | 3656 |
| Relative reduction in standard deviation compared to optimization with initial uncertainty ranges | 21% | 27% | 27% |
| Objective function, STB | 44690 | 40804 | 37148 |

Figure 5:
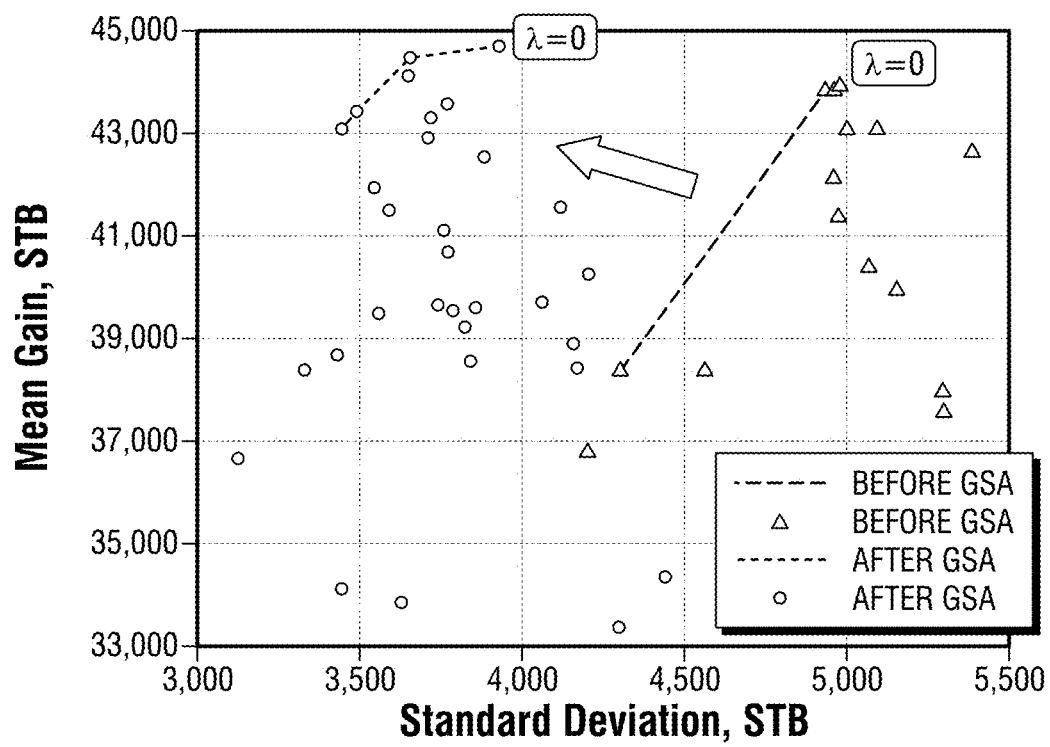
FIG. 5 is a plot of an efficient frontier for an EOR performance metric (incremental oil recovery) before utilizing the method of FIG. 2, and after utilizing the method of FIG. 2.
Figure 6:
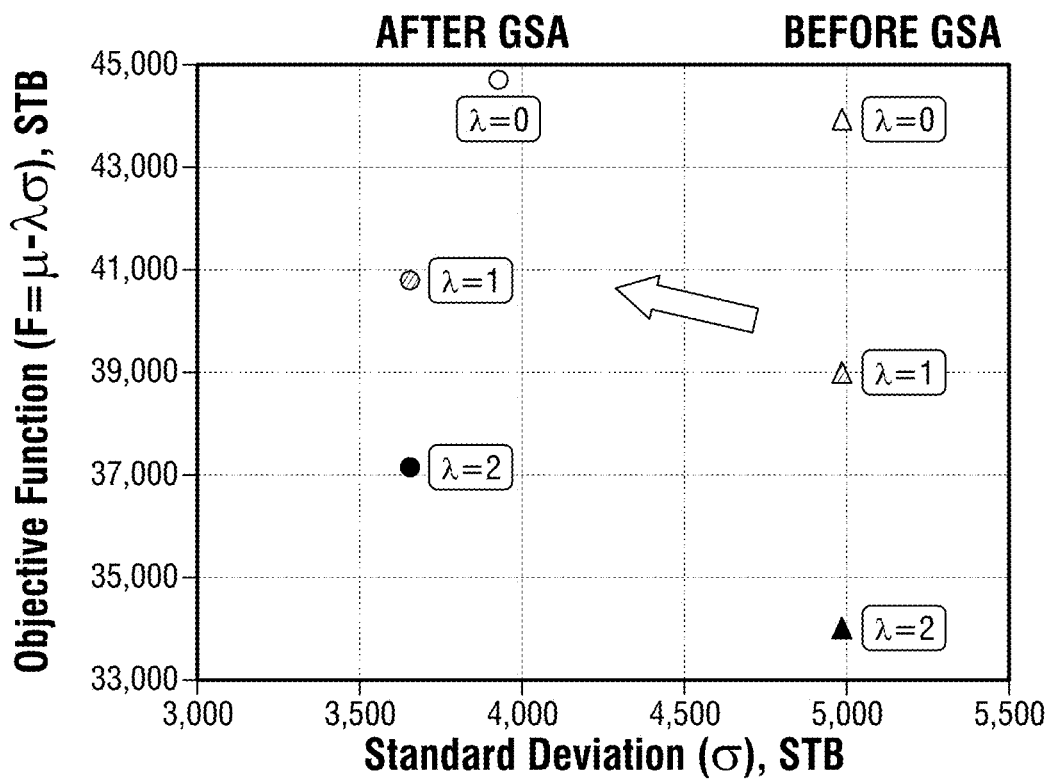
FIG. 6 is a plot of optimal values of an objective function based on an EOR performance metric (incremental oil recovery) corresponding to three levels of risk tolerance before utilizing the method of FIG. 2, and after utilizing the method of FIG. 2.

As seen in FIG. 5, the updated efficient frontier ("after GSA") moves to the left (desired reduction in uncertainty) relative to the initial analysis ("before GSA"). The vertical direction of the shift in efficient frontier depends on underlying values in the physical quantity of interest (cumulative oil production) in the updated range of the uncertain parameter. FIG. 6 examines the points corresponding to λ={0, 1, 2}. The shift to the left (compared to "before GSA") represents a relative reduction in standard deviation of 21% for λ=0, and 27% for λ={1, 2}. The shift of efficient frontier to the left in FIG. 5 is expected in most cases, with the rare exception being when the local variance underlying values in the physical quantity of interest in the updated range of the uncertain parameter is higher than that in the initial range. However, even for this exceptional case, the disclosed approach provides an iterative manner of accurately estimating risk-reward profile for a given EOR scenario and allows avoidance of costly mistakes that could result in an underperforming reservoir.

In one embodiment, the values of uncertain parameters β with low values of S1 and/or ST (e.g., <0.05) may be fixed in order to reduce the dimensionality of the optimization problem. Thus, in the provided example, the values of multipliers for parameters of polynomial viscosity model (zero shear-rate), ST values are very close to zero (see Table 3). Fixing these parameters in the middle of their original uncertainty range would not significantly affect the outcome of the subsequent analysis, but would improve the computational cost since the dimensionality of the problem is reduced.

In one aspect, the described predictive physics-based reservoir simulation is used to estimate performance of an EOR project such as, by way of example and not by way of limitation, total or incremental oil production, recovery factor, displacement efficiency, the net present value (NPV) of a project, etc.

Figure 7:
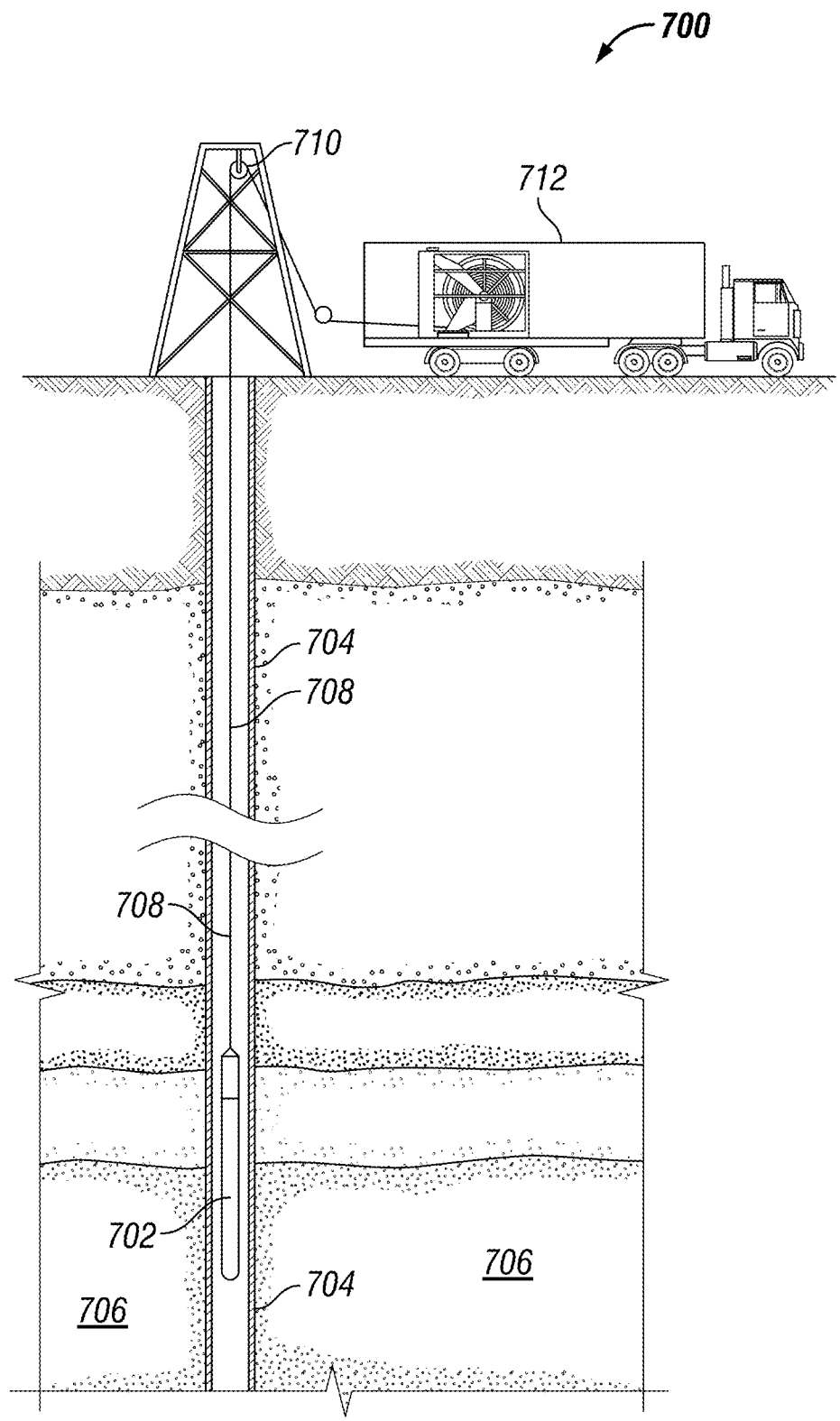
FIG. 7 shows a measurement tool in accordance with one embodiment of the present disclosure.

The measurements of the formation and/or the fluids of the formation, which are used to reduce uncertainty in one or more uncertain parameters, can be made using a measurement tool. The measurement tool can be a surface tool, such as a core analysis tool, that is used to determine permeability and/or porosity of the formation by measuring a characteristic of the formation or a formation sample (e.g., a core sample). In another example, the measurement tool can be a different surface tool, such as a seismic survey system that performs a seismic evaluation of the formation. The measurement tool may also be a wellbore tool, such as a wireline logging tool or a logging-while-drilling tool. FIG. 7 shows one example of a wireline logging system 700 at a well site. The system includes a wireline logging tool 702 that is lowered into a wellbore 704 and that traverses the formation 706 using a cable 708 and a winch 710. The wireline tool 702 makes a number of measurements of the adjacent formation 706. The data from these measurements is communicated through the cable 708 to surface equipment 712, which may include a processing system for storing and processing the data obtained by the wireline tool 702. The surface equipment 712 includes a truck that supports the wireline tool 702. In other embodiments, the surface equipment may be located in other locations, such as within a cabin on an off-shore platform. The wellbore tool may include various different modules for performing measurements on the formation. For example, the wellbore tool may include a fluid sampling module for capturing fluid from the formation and/or for analyzing the fluid within the wellbore tool. Other examples include modules for making electrical measurements of the formation (e.g., resistivity and dielectric), acoustic measurements of the formation (e.g., sonic), and/or nuclear measurements of the formation (e.g., gamma-way and neutron). The term "measurement tool" should not be construed to limit the embodiments disclosed herein to any particular sensor or measurement device.

A processing system can be used to implement or perform any of the methods and processes for adaptive optimization of EOR performance under uncertainty described above. The term "processing system" should not be construed to limit the embodiments disclosed herein to any particular device type or system. The processing system may be a laptop computer, a desktop computer, or a mainframe computer. The processing system may also include a processor (e.g., a microprocessor, microcontroller, digital signal processor, or general purpose computer) for executing any of the methods and processes described above (e.g. processes 102-114 in FIG. 2). The processing system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. This memory may be used to store, for example, control variables, uncertain parameters, reservoir models, and/or instructions for performing the processes described above.

Any of the methods and processes described above (e.g. processes 102-114 in FIG. 2) can be implemented as computer program logic for use with the processing system. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the processing system. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

There have been described and illustrated herein several embodiments of methods for adaptive optimization of enhanced oil recovery project performance under uncertainty. While particular embodiments and aspects have been described, it is not intended that the disclosure be limited thereto, and it is intended that the claims be as broad in scope as the art will allow and that the specification be read likewise. Thus, while particular control variables and uncertain variables were described, it will be appreciated that other control variables and/or other uncertain variables could be utilized. Thus, by way of example only, control variables may include target production and injection rates, injector/production well spacing, chemical composition and concentration of an EOR agent, etc. Also by way of example only, uncertain variables may include porosity, permeability, parametric dependence of relative permeability curves, viscosity as a function of an EOR agent concentration, an EOR agent adsorption by the rock, etc. In addition it will be appreciated that while particular GSA computation approaches such as Polynomial Chaos Expansion were described, other GSA approaches could be utilized. Further, while particular sensitivity indices were described, other indices could be utilized. Similarly, while a particular uncertainty contribution threshold value was described for the purpose of fixing the value of an uncertain variable, other thresholds could be utilized. It will therefore be appreciated by those skilled in the art that yet other modifications could be made. Accordingly, all such modifications are intended to be included within the scope of this disclosure as defined in the following claims. In the claims, means-plus-function clauses, if any, are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method of performing an enhanced oil recovery (EOR) project for a formation containing fluids, the method comprising:
   defining a performance metric, a plurality of control variables, and a plurality of uncertain variables of the EOR project;
   applying the plurality of control variables and the plurality of uncertain variables as input parameters into a predictive physics-based reservoir model;
   optimizing the performance metric under initial uncertainty of the plurality of uncertain variables to obtain a set of optimized values of the control variables that provide an initial optimum of an objective function based on the performance metric;
   conducting a global sensitivity analysis for the plurality of uncertain variables using the set of optimized values of the control variables, wherein the sensitivity analysis comprises a first order sensitivity index;
   performing a measurement, using at least one of a core analysis surface tool or a seismic survey surface tool, on at least one of the plurality of uncertain variables to reduce uncertainty in at least one of the plurality of uncertain variables;
   optimizing the performance metric with reduced uncertainty in the at least one of the plurality of uncertain variables to obtain an updated set of optimized values of the control variables that provide an updated optimum of the objective function based on the performance metric;
   running the reservoir model with the updated set of optimized values of the control variables in order to determine performance of the EOR project; and
   performing the EOR project on a formation according to the updated set of optimized values of the control variables, wherein performing the EOR project includes altering an operation of a production well or an injection well based upon, at least in part, the updated set of optimized values of the control variables.

2. The method according to claim 1, further comprising: repeating the conducting, the performing, the optimizing with reduced uncertainty, and the running a plurality of times.

3. The method according to claim 1, further comprising: determining contributions of the plurality of uncertain variables to total uncertainty of the performance metric.

4. The method according to claim 3, further comprising: ranking the plurality of uncertain variables based on their contribution to total uncertainty of the performance metric, wherein the reducing comprises selecting an uncertain variable from the plurality of uncertain variables contributing to the total uncertainty.

5. The method according to claim 4, wherein the selecting comprises selecting a highest ranked uncertain variable, and wherein the sensitivity analysis comprises a total sensitivity index.

6. The method according to claim 3, further comprising: comparing the contribution of the at least one uncertain variable to a threshold value.

7. The method according to claim 6, further comprising: setting a value of at least one uncertain variable to a fixed value prior to the repeating based on whether a contribution of the at least one uncertain variable is less than the threshold value.

8. The method according to claim 7, wherein the setting a value comprises setting the value to a midpoint value for the uncertain variable.

9. The method according to claim 7, wherein the objective function is $F(\alpha,\beta)=\mu(\alpha, \beta)-\lambda\sigma(\alpha, \beta)$ where $\alpha$ are the plurality of control variables, $\beta$ are the plurality of uncertain variables, $\mu$ and $\sigma$ are the mean and standard deviation of the performance metric computed based on an output of the reservoir model respectively, and $\lambda$ is a non-negative parameter defining a tolerance to risk.

10. The method according to claim 9, wherein the plurality of uncertain variables include at least two of:
   viscosity of water as a function of an EOR agent concentration,
   surface tension of water-oil interface as a function of an EOR agent concentration,
   saturated concentration of an EOR agent adsorbed by the formation, and
   miscibility of oil and water with an EOR agent as a function of the capillary number.

11. The method according to claim 9, wherein the plurality of control variables include at least one of:
   target rate of a production well,
   target rate of an injection well, and
   an EOR agent concentration in the injected fluid in the injection well corresponding to at least one period of injection.

12. The method according to claim 1, wherein the defining comprises defining probability distribution functions (pdfs) for the uncertain variables.

13. The method according to claim 1, wherein the objective function is $F(\alpha, \beta)=\mu(\alpha, \beta)-\lambda\sigma(\alpha, \beta)$ where $\alpha$ are the plurality of control variables, $\beta$ are the plurality of uncertain variables, $\mu$ and $\sigma$ are the mean and standard deviation of the performance metric computed based on an output of the reservoir model respectively, and $\lambda$ is a non-negative parameter defining a tolerance to risk.

14. The method according to claim 1, wherein the plurality of uncertain variables include at least two of:
   water relative permeability at residual oil saturation,
   gas relative permeability at residual oil saturation,
   viscosity of water as a function of an EOR agent concentration,
   surface tension of water-oil interface as a function of an EOR agent concentration, saturated concentration of an EOR agent adsorbed by the formation, and
   miscibility of oil and water with an EOR agent as a function of the capillary number.

15. The method according to claim 1, wherein the plurality of control variables include at least one of:
   target rate of a production well,
   target rate of an injection well, and
   an EOR agent concentration in the injected fluid in the injection well corresponding to at least one period of injection.

16. The method according to claim 1, wherein the performance metric include at least one of: oil recovery efficiency, incremental oil production, total oil production, and financial indicator of project profitability.

17. The method according to claim 1, wherein performing the measurement on at least one of the plurality of uncertain variables comprises:
   performing a measurement of at least one of the formation and the fluids within the formation.

18. The method according to claim 1, further comprising: performing the EOR project using the updated set of optimized values of the control variables.

19. The method according to claim 1, wherein:
   the plurality of uncertain variables include an aqueous phase viscosity at a non-zero shear rate, and
   the objective function is $F(\alpha, \beta)=\mu(\alpha, \beta)-\lambda\sigma(\alpha, \beta)$ where $\alpha$ are the plurality of control variables, $\beta$ are the plurality of uncertain variables, $\mu$ and $\sigma$ are the mean and standard deviation of the performance metric computed based on an output of a the reservoir model respectively, and $\lambda$ is a non-negative parameter defining a tolerance to risk.

20. A method for performing an enhanced oil recovery (EOR) project under uncertainty, the method comprising:
   utilizing a predictive physics-based reservoir model to estimate the performance of the EOR project;
   identifying a plurality of input parameters into predictive physics-based reservoir the model as control variables and uncertain variables;
   optimizing the predictive physics-based reservoir model to obtain values of control variables maximizing a mean value of a chosen performance metric under initial uncertainty of formation and fluid properties;
   applying a global sensitivity analysis to quantify and rank contributions from uncertain input parameters to the standard deviation of the optimized values of the performance metric, wherein the sensitivity analysis comprises a first order sensitivity index;
   obtaining additional information using a wellbore measurement tool regarding at least one high-ranking of the uncertain variables in order to reduce uncertainty therein;
   optimizing the predictive physics-based reservoir model with at least one uncertain parameter having reduced uncertainty, to obtain a set of updated set of optimized values of the control variables;
   using the model to provide a performance analysis for the EOR project; and
   performing an EOR project on a formation according to the updated set of optimized values of the control variables, wherein performing the EOR project includes altering an operation of a production well or an injection well based upon, at least in part, the updated set of optimized values of the control variables.

21. A system for adaptive optimization of an enhanced oil recovery (EOR) project for a formation containing fluids, the system comprising:
   a wireline logging system measurement tool configured to perform a measurement on at least one of the formation and a sample from the formation; and
   a processing system configured to:
   (i) define a performance metric, a plurality of control variables, and a plurality of uncertain variables of the EOR project;
   (ii) apply the plurality of control variables and the plurality of uncertain variables as input parameters into a predictive physics-based reservoir model;
   (iii) optimize the performance metric under initial uncertainty of the plurality of uncertain variables to obtain a set of optimized values of the control variables that provide an initial optimum of an objective function based on the performance metric;
   (iv) conduct a global sensitivity analysis for the plurality of uncertain variables using the set of optimized values of the control variables, wherein the sensitivity analysis comprises a first order sensitivity index;

(v) reduce uncertainty in at least one of the plurality of uncertain variables using measurements performed by the wireline logging system measurement tool;
(vi) optimize the performance metric with reduced uncertainty in the at least one of the plurality of uncertain variables to obtain an updated set of optimized values of the control variables that provide an updated optimum of the objective function based on the performance metric;
(vii) running the reservoir model with the updated set of optimized values of the control variables in order to determine performance of the EOR project; and wherein the wireline logging system measurement tool is used, in part, to perform the EOR project on a formation according to the updated set of optimized values of the control variables,
wherein performing the EOR project includes altering an operation of a production well or an injection well based upon, at least in part, the updated set of optimized values of the control variables.

* * * * *